United States Patent [19]

Boice et al.

[11] Patent Number: 4,470,705
[45] Date of Patent: Sep. 11, 1984

[54] MIXING AND FEEDING MACHINE

[76] Inventors: Richard K. Boice, RD, Arquint Rd., Vernon Center, N.Y. 13477; Michael R. Green, 178 Bacon St., Waterville, N.Y. 13480

[21] Appl. No.: 461,957

[22] Filed: Jan. 28, 1983

[51] Int. Cl.$^3$ .............................................. B01F 15/02
[52] U.S. Cl. .................................... 366/186; 366/271; 366/603
[58] Field of Search ............... 198/558, 615, 616, 677; 280/638; 296/35.3; 366/42, 50, 66, 67, 141, 186, 188, 271, 603, 607

[56] References Cited

U.S. PATENT DOCUMENTS 3,412,982 11/1968 Feterl .................................. 366/603
4,135,827 1/1979 Thomas ............................... 366/141
4,387,834 6/1983 Bishop ................................. 198/615

*Primary Examiner*—Robert W. Jenkins
*Assistant Examiner*—Arthur D. Dahlberg

[57] ABSTRACT

A self-propelled mixing and feeding machine on which the operator can ride. The machine comprises a wheeled, steerable chassis having a hopper mounted thereon. The hopper includes a mixing chamber provided with chain driven mixing means for the cattle feed. A discharge chamber is located in the hopper below one area of the mixing chamber. A feature of the machine is the low location of the discharge chamber and its discharge opening whereby the flow of feed is aided by gravity. Another feature resides in the novel means to minimize compacting of the feed in the vicinity of the opening between the mixing and discharge chambers. Still another feature of the machine is a means for quickly and easily replacing a discharge auger of one diameter with an auger of another diameter. When the machine is provided with an electronic scale that gives a digital reading of the weight of the feed in the hopper, another of its features is an independent suspension means for connecting the hopper to the machine chassis.

2 Claims, 4 Drawing Figures

MIXING AND FEEDING MACHINE

BACKGROUND OF THE INVENTION

This invention relates generally to farm equipment, and has particularly reference to a novel mixing and feeding machine that is particularly adapted for the in-barn feeding of diary cattle.

Heretofore, a number of different machines have been developed to permit mechanized cattle feeding. Some of these machines are feeders only, meaning that their function is to deliver measured amounts of premixed feed to designated feeding stations. Other machines are both mixers and feeders, meaning that they operate to mix the ingredients of a feed mixture as well as to dispense it. The feeder and mixer-feeder machines are mobile. There are also stationary machines whose only function is to mix different kinds of feeds.

Except for very large machines, most of the feeders and mixer-feeders on the market do not have any provision for the operator to ride on the machine. An exception to this is a feeding machine produced by the assignee of the present invention. The machine referred to has a removable platform upon which the operator can stand or sit while operating the machine.

In many feeder and mixer-feeder machines of the prior art there have been problems in connection with obtaining a smooth and continuous flow of the feed to the discharge opening of the machine. Thus, the feed or feed mix may be dry in part and moist and sticky in part, and such a condition can cause the feed to compact in various areas of the mixing chamber of the machine. This condition can also cause the feed to "bridge over" adjacent the machine discharge with the result that the flow of the feed is erratic or stops altogether.

SUMMARY OF THE INVENTION

The machine to be disclosed herein is a self-propelled mixing and feeding machine on which the machine operator can ride. The machine comprises a wheeled, steerable chassis having a hopper mounted thereon. The hopper includes a mixing chamber that is provided with chain driven mixing means for the cattle feed.

A discharge chamber is located in the hopper below one area of the mixing chamber. An opening between the chambers is provided with a door that is movable between closed and open positions, the door normally being closed during the initial mixing of the feed. When the door is open, gravity and the mixing means cause the feed to flow into the discharge chamber from whence it is discharged by means of a rotating auger.

A feature of the machine of the invention is the low location of the discharge chamber and its discharge opening whereby a smooth flow of the feed is aided by gravity. Another feature of the machine resides in the provision of novel means to minimize compacting of the feed in the vicinity of the opening between the mixing and discharge chambers. Still another feature of the invention is a means for quickly and easily replacing a discharge auger of one diameter with an auger of another diameter to accommodate different kinds and mixtures of cattle feed.

It is contemplated that the mixing and feeding machine of the inventon will be provided with an electronic computer or scale capable of giving a digital reading of the weight of the feed in the hopper at any time. When the machine is equipped in this manner, another of its features is an independent suspension means for connecting the hopper to the machine chassis, the suspension means consisting of a weigh bar at each of the three points at which the hopper is connected to the chassis.

DESCRIPTION OF THE PREFERRED EMBODIMENT

Figure 1:
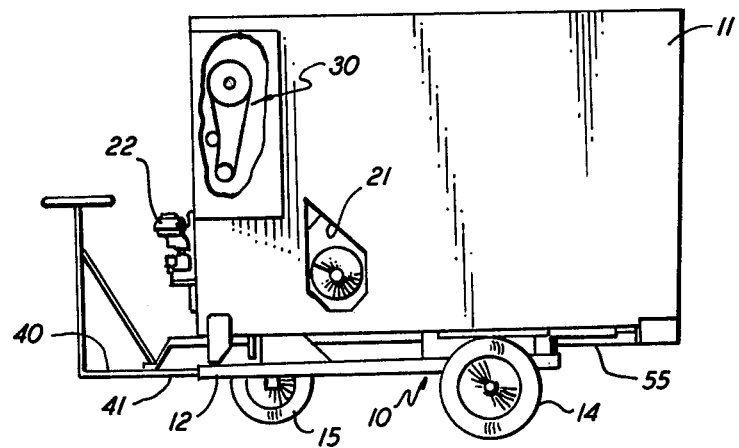
FIG. 1 is a side elevation of a mixing and feeding machine embodying the invention with a portion broken away to illustrate a detail of the construction.

Having reference now to the drawings, and with particular reference to FIGS. 1 and 4, the mixing and feeding machine is essentially comprised of a wheeled chassis 10 and an open topped hopper 11 that is mounted on the chassis in a manner to be described hereinafter. The chassis 10 includes a generally rectangular frame 12 made of structural steel members and a pair of front drive wheels 14 and steerable directional wheels 15 located adjacent the rear of the machine on its longitudinal center line. The front and rear wheels are connected to and supported the frame in a conventional manner.

Figure 2:
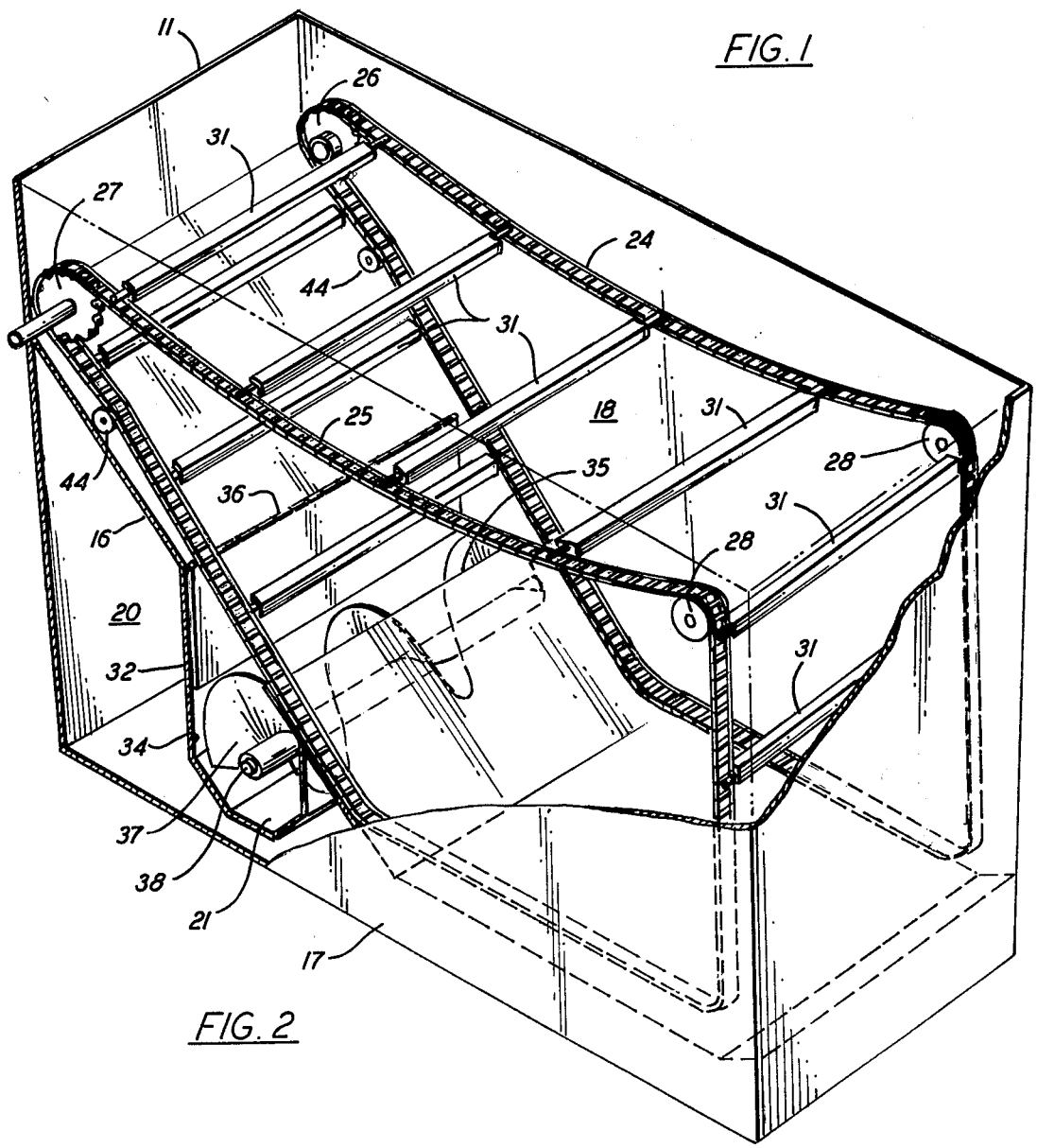
FIG. 2 is an elarged perspective view of the machine hopper with a portion of its side walls broken away.
Figure 4:
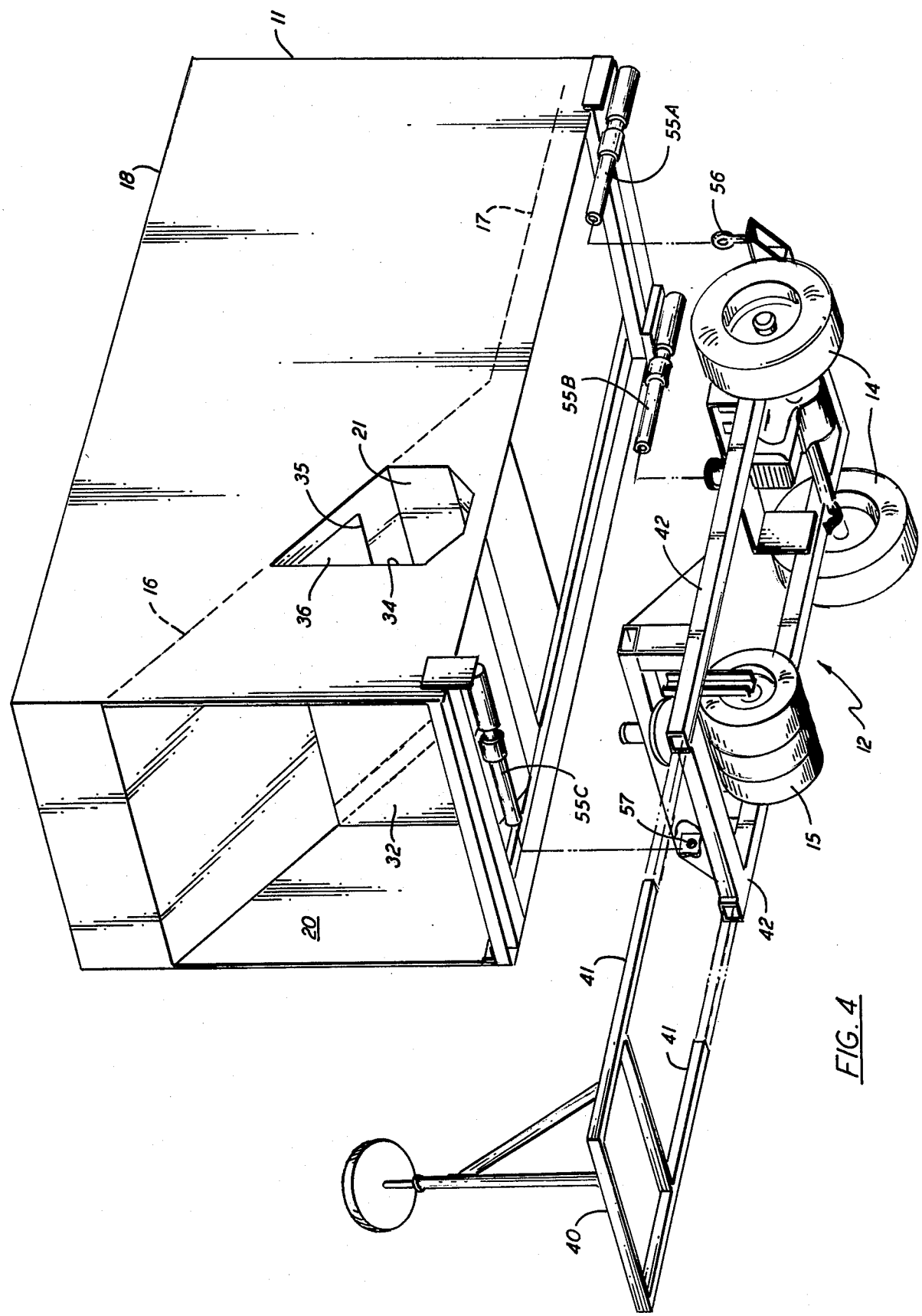
FIG. 4 is an enlarged, exploded perspective view of the mixing and feeding machine illustrating the independent suspension means for the hopper.

The hopper 11 is a rectangular box-like structure in which there is an obliquely disposed interior partition 16, the partition extending from near the upper edge of the rear end of the hopper down to the bottom 17 of the hopper on a line approximately midway between its front and rear ends as best shown in FIGS. 2 and 4. Partition 16 divides the hopper into a feed receiving and mixing chamber 18 and an auxiliary chamber 20. The auxiliary chamber is open to the rear and provides space for a discharge chamber 21, the engine 22 for the machine, FIG. 1, and the various controls for controlling movement of the machine and the operation of the feed mixing means and discharge auger.

The feed mixing means is located in the mixing chamber 18, FIG. 2, and comprises a pair of continuous chains 24 and 25 located on opposite sides of the chamber as shown. The chains 24 and 25 are respectively driven by drive gears 26 and 27, and the chains also engage rollers 28 that are located so that the chains extend along the top of the hopper, then downwardly adjacent the front wall thereof and then along the bottom of the hopper from whence they follow the inclined partition 16 back to the drive gears. The drive gears 26 and 27 are driven by the engine 22 through a conventional clutch (not shown) and a conventional chain and gear drive 30 as indicated in FIG. 1.

Extending between the continuous chains 24 and 25, FIG. 2, transversely with respect to the mixing chamber, are a plurality of steel mixing slats 31, the opposite ends of the slats being respectively fixed to the chains. With this arrangement, when the chains are driven by their drive gears they agitate the cattle feed in the hopper and when there are two or more different kinds of feed, as is the usual case, these are thoroughly mixed.

As shown in the drawings, the discharge chamber 21 is defined by a generally U-shaped wall enclosure 32 that is secured to and extends downwardly from the underside of the inclined partition 16. The chamber has a discharge opening 34 on one side of the hopper and is closed on the other side thereof. The mixing chamber 18 communicates with the discharge chamber 21 through an opening 35 in the partition and this opening is provided with a door 36 that is movable between closed and open positions, the door being shown in open position in FIGS. 2 and 3.

The discharge chamber 21 contains an auger 37, FIG. 2, that is releasably mounted on an auger drive shaft 38 in a manner to be described. The drive shaft is driven by the engine 22 through conventional drive means (not shown) located on the side of the hopper opposite the discharge opening 34. As will be understood, when the auger 37 is rotating it operates to discharge feed mix in the discharge chamber out through the discharge opening 34.

As shown in FIGS. 1 and 4, the mixing and feeding machine can be equipped with a detachable platform 40 on which the machine operator can stand or sit while operating the machine. The platform includes outwardly projecting rails 41, FIG. 4, that are slidably received in the hollow longitudinal structural members 42 on the chassis frame 12. This sliding connection permits the operator platform to be quickly attached to and detached from the machine as well as permitting some adjustability of its position relative to the machine.

When the feed mixing means in mixing chamber 18, FIG. 2, is operating there is a tendency for the feed mix to lodge and be compacted in the area of the chamber above the opening 35. Thus, the feed mix tends to compact between the partition 16 above the opening and the mixing slats 31, and this means that excessive power is required to drive the mixing means and at times the compacted feed causes slats to bend. To alleviate this problem, idler rollers 44 are mounted on the side walls of the hopper so that they engage the chains 24 and 25, the rollers being positioned so that they increase the spacing between the chains and the partition 16 in the area of the latter above the opening 35 as shown in FIG. 2. This expedient greatly minimizes compaction of the feed mix and thus the pressure build up in this area, whereby the machine can operate more efficiently.

Figure 3:
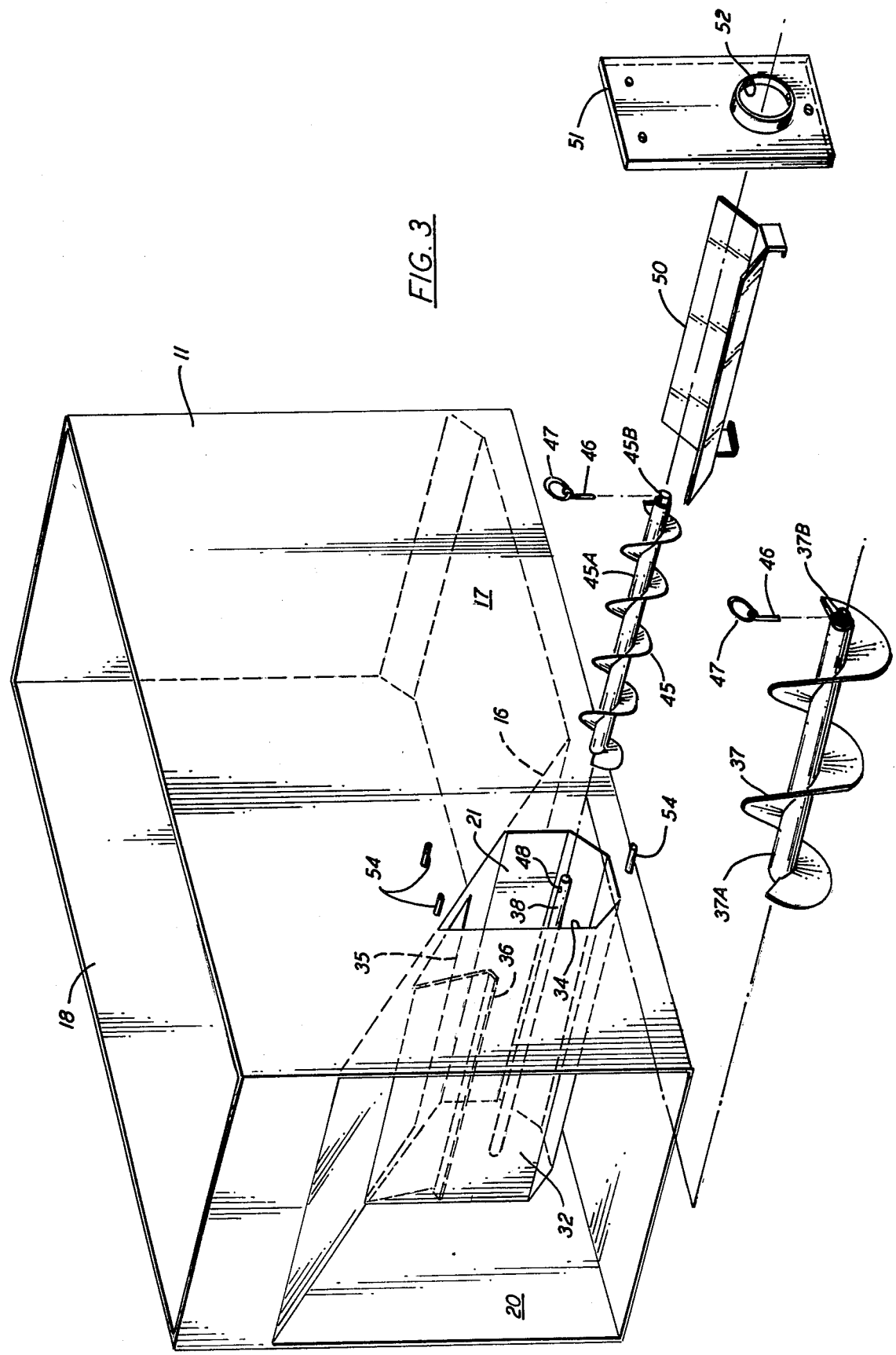
FIG. 3 is an enlarged, exploded perspective view of the machine hopper illustrating the interchangeable auger arrangement.

Another feature of the invention is the interchangeable auger arrangement best shown in FIG. 3. It is known that for efficient machine operation different feeds and feed mixes require discharge augers of different diameters. For example, a 10 inch or 12 inch auger as shown at 37 in FIGS. 2 and 3 performs best in discharging mixed rations and all forages whereas a five inch or six inch auger as shown at 45 in FIG. 3 is best suited for discharging flowable grains.

To enable rapid replacement of one of these augers for the other, the augers 37 and 45 are formed with hollow central shafts 37A and 45A which are dimensioned so that they mount on the auger drive shaft 38 with a sliding fit. The selected auger is retained on the shaft by a commercially available quick disconnect snap pin 46 that passes through registering holes in the auger shaft and the drive shaft after which the ring portion 47 of the snap pin snaps over the outer end of the drive shaft to secure the parts together. The holes in the auger shafts are shown at 37B and 45B respectively for the shafts 37A and 45A, and the drive shaft hole is shown at 48.

When the small diametered auger 45 is used, a removable auger pan or tray 50, FIG. 3, is inserted in the discharge chamber 21 beneath the auger. The tray is dimensioned so that it fits closely around the lower half of the auger and its purpose is to prevent the feed from filling in the space below the auger that results from its smaller diameter. In addition to the tray 50, the small auger 45 requires an auxiliary cover plate 51 that has a discharge opening 52 of the same diameter as the auger. The cover plate is releasably secured in position by dowel pins 54 and snap pins (not shown). By providing a discharge opening 52 having the same diameter as the auger, the amount of feed being discharged can be accurately measured by means well known in the art.

It is contemplated that the mixing and feeding machine will be provided with an electronic computer or scale (not shown) capable of giving a digital reading of the weight of the feed in the hopper 11 at any time. When the machine is so equipped, another of its features is an independent suspension means for connecting the hopper to the chassis 10 so that the amount of feed that is being added to or removed from the mixing chamber 18 can be accurately weighed without the machine operator's own weight affecting the scale system in any way. Thus, whether or not the operator is on the operator platform 40 should not affect the accuracy of the measurement.

The independent suspension means is shown in FIG. 4 and includes three weigh bars 55 each of which is secured at one end to the hopper 11 and at the other end to the chassis 10. Two of these bars 55A and 55B are connected to the front end of the hopper on each side thereof and extend rearwardly as shown with their rear ends being secured to eye bolts 56 (only one of which is shown) on the chassis. The third weigh bar 55C is connected to the rear end of the hopper and extends transversely thereof with its inner end being secured to a plate 57 on the chassis.

The weigh bars 55 are well known, commercially available devices, suitable bars being marketed by the Eaton Corporation, Cleveland, Ohio. The weight of the feed in the hopper creates a bending moment in each bar and the bars are provided with strain gauges (not shown) that are electrically connected to the electronic scale.

From the foregoing description, it will be apparent that the invention disclosed herein provides a novel and very versatile mixing and feeding machine for dairy cattle. As will be understood by those familiar with the art, the invention may be embodied in other specific forms without departing from the spirit or essential characteristics thereof.

We claim:

1. A mixing and feeding machine, particularly for the in-barn feeding of dairy cattle, comprising a wheeled chassis, a hopper mounted on the chassis having a mixing chamber therein, means in the mixing chamber for mixing two or more different cattle feeds that have been placed therein, a discharge chamber in communication with the mixing chamber whereby feed mix is moved from the mixing to the discharge chamber by the mixing means, a rotatable auger and drive shaft in the discharge chamber for discharging the feed mix from the machine, the rotatable auger being releasably mounted on the shaft by quick disconnect means so that augers of different diameters can be interchangeably mounted on the same shaft to accommodate different kinds of cattle feed.

2. A mixing and feeding machine as defined in claim 1 together with means on the machine for propelling it and a removable platform on which the machine operator can ride.

* * * * *